United States Patent
Houssat et al.

(10) Patent No.: US 10,246,057 B2
(45) Date of Patent: Apr. 2, 2019

(54) ADAPTOR FOR CONNECTING A WINDSCREEN WIPER UNIT TO A DRIVING ARM

(71) Applicant: Valeo Systèmes d'Essuyage, Le Mesnil Saint Denis (FR)

(72) Inventors: Stéphane Houssat, Blanzat (FR); Olivier Jomard, Aubiere (FR); Vincent Gaucher, Ennezat (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/403,248

(22) Filed: Jan. 11, 2017

(65) Prior Publication Data
US 2017/0197593 A1    Jul. 13, 2017

(30) Foreign Application Priority Data
Jan. 13, 2016   (FR) ..................................... 16 50256

(51) Int. Cl.
*B60S 1/40*    (2006.01)

(52) U.S. Cl.
CPC ........... *B60S 1/4038* (2013.01); *B60S 1/4003* (2013.01); *B60S 1/4009* (2013.01); *B60S 1/4019* (2013.01); *B60S 1/4074* (2013.01); *B60S 1/4077* (2013.01); *B60S 1/40* (2013.01); *B60S 2001/4012* (2013.01)

(58) Field of Classification Search
CPC .... B60S 1/4006; B60S 1/4009; B60S 1/4016; B60S 1/4019; B60S 1/4077; B60S 1/4048; B60S 1/4003; B60S 1/407; B60S 2001/4012; B60S 1/40

USPC ...................................................... 15/250.32
See application file for complete search history.

(56) References Cited

U.S. PATENT DOCUMENTS

| 4,179,767 | A  | * | 12/1979 | Weiler | B60S 1/4019 |
|||||| 15/250.32 |
| 4,450,602 | A  | * | 5/1984 | Maiocco | B60S 1/4003 |
|||||| 15/250.32 |
| 2006/0117515 | A1 | * | 6/2006 | Fink | B60S 1/38 |
|||||| 15/250.32 |
| 2008/0163446 | A1 | * | 7/2008 | Thienard | B60S 1/3849 |
|||||| 15/250.32 |

(Continued)

FOREIGN PATENT DOCUMENTS

| DE | 2624953 | * 12/1977 |
| FR | 2848956 | * 12/2003 |
| GB | 2019203 | * 10/1979 |

OTHER PUBLICATIONS

Machine translation of description portion of French publication 2848956, published Dec. 2003.*

*Primary Examiner* — Gary K. Graham
(74) *Attorney, Agent, or Firm* — Osha Liang LLP

(57) ABSTRACT

Adaptor (112) for connecting a windscreen wiper unit (10) to a driving arm (26), the adaptor comprising two substantially parallel walls (28) connected together by means of at least one connecting element (30), the said walls having first, inner, side faces (28*a*) between which the said at least one connecting element extends, and outer side faces (28*b*), the said adaptor further having at least one stop element which is mounted on one of the said walls and which projects at least partially from the said outer side face of this wall, characterized in that the said at least one element (150) is movable between an operational stop position and a non-operational position.

15 Claims, 5 Drawing Sheets

(56) References Cited

U.S. PATENT DOCUMENTS

Figure 4D:
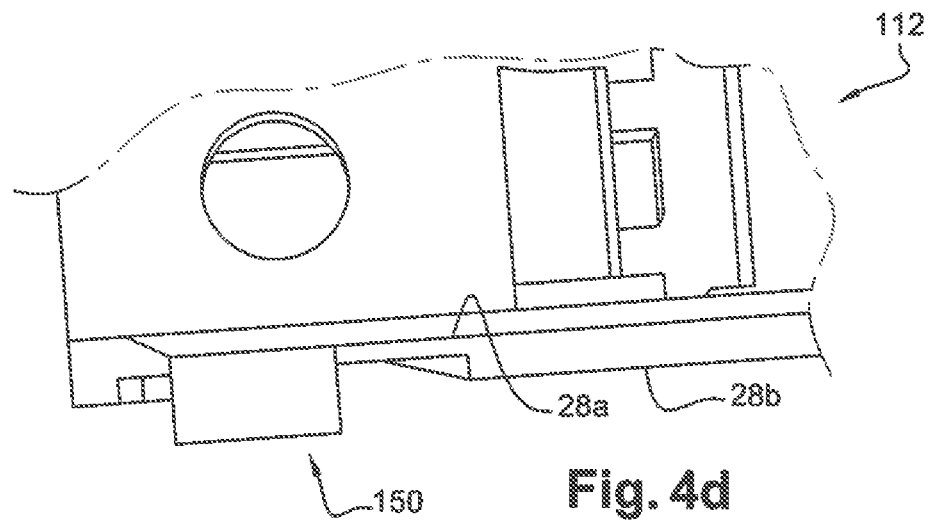

| | | | |
|---|---|---|---|
| 2013/0212826 A1* | 8/2013 | Lee | B60S 1/3867 15/250.32 |
| 2014/0068886 A1* | 3/2014 | Ku | B60S 1/40 15/250.32 |
| 2015/0166017 A1* | 6/2015 | Young, III | B60S 1/4003 15/250.32 |

* cited by examiner

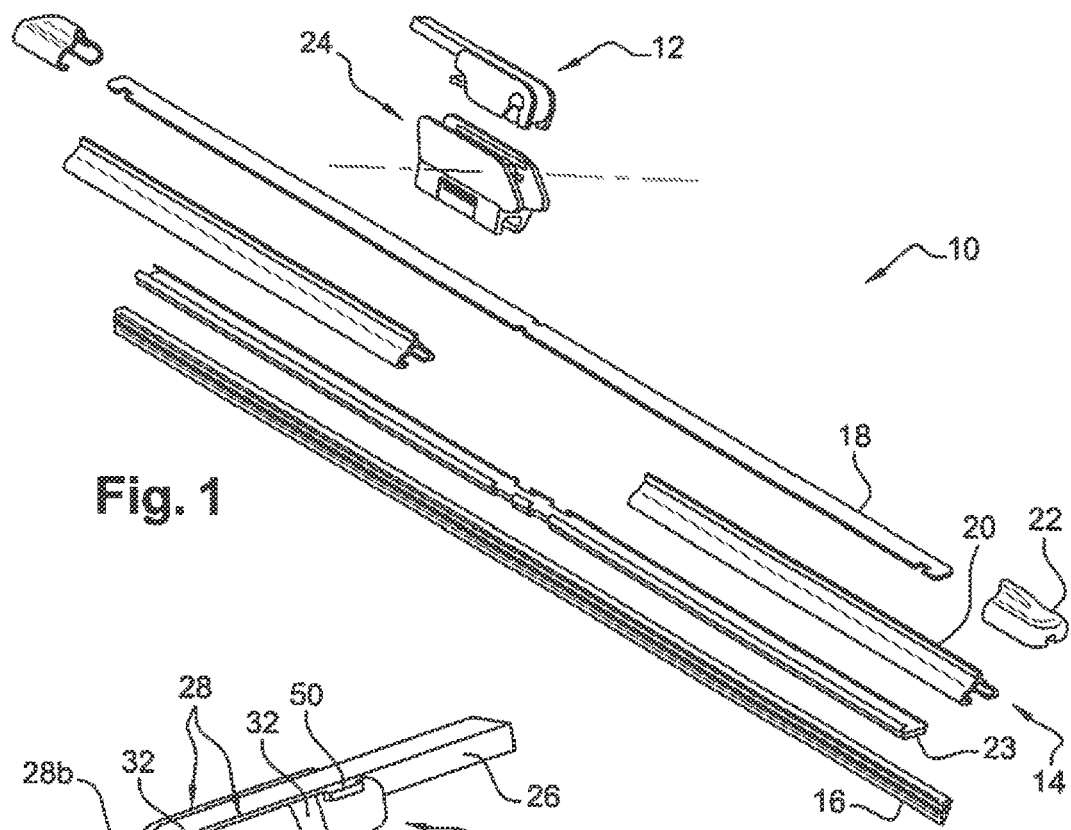
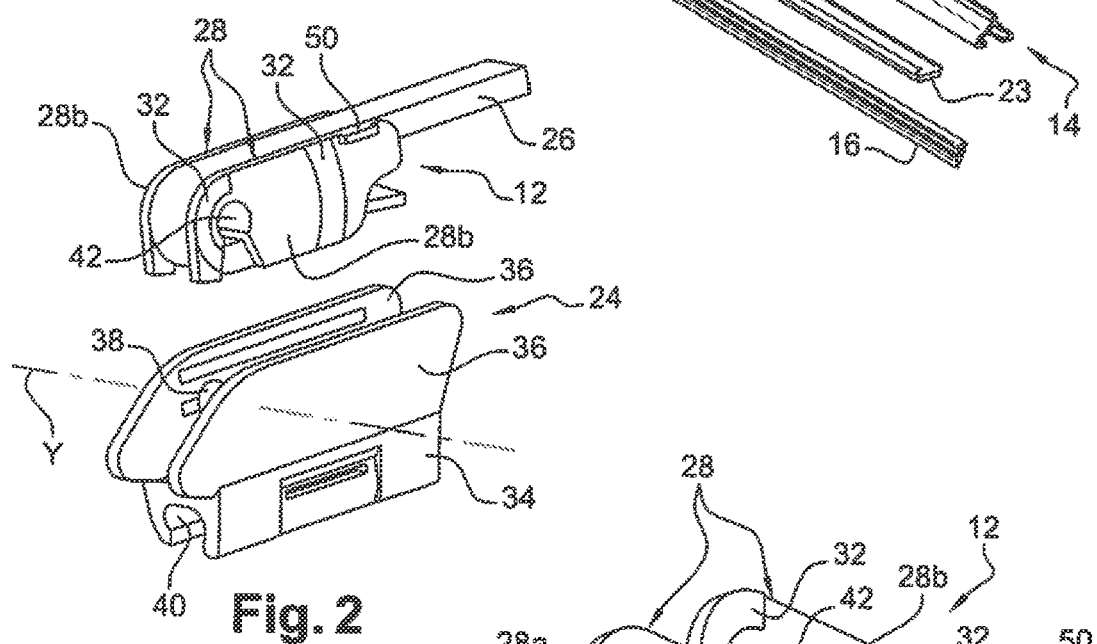
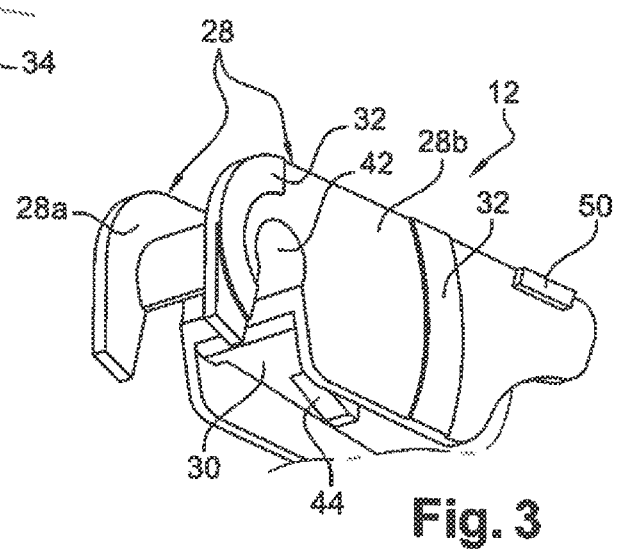
Fig. 1
Fig. 2
Fig. 3

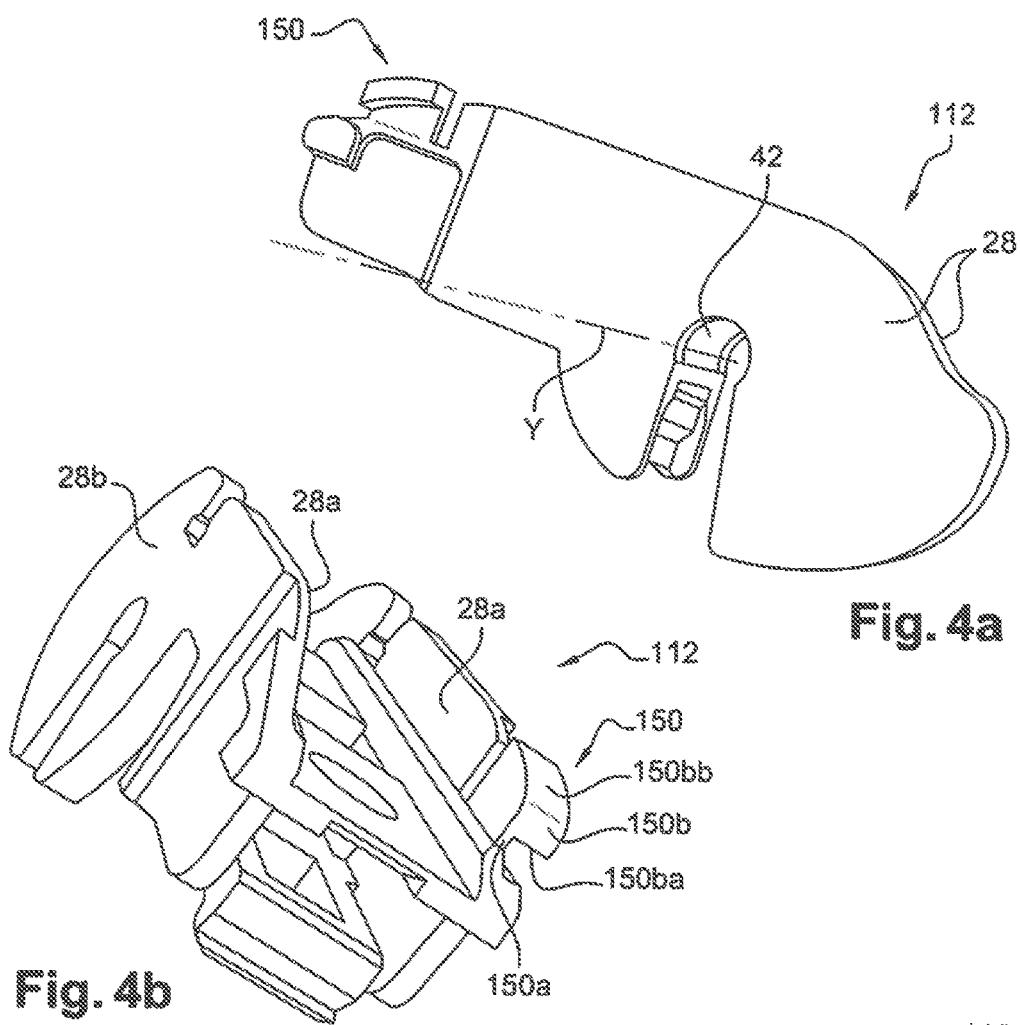
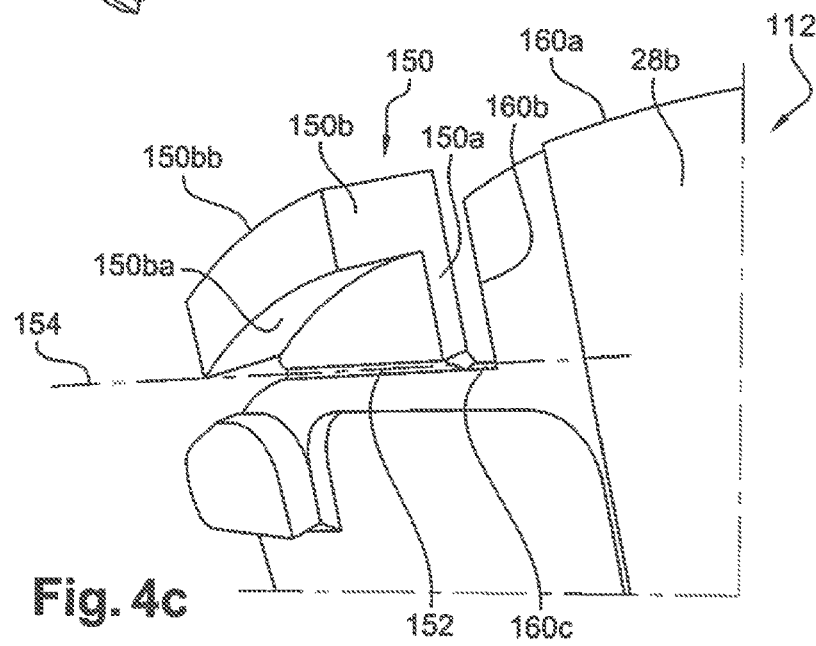

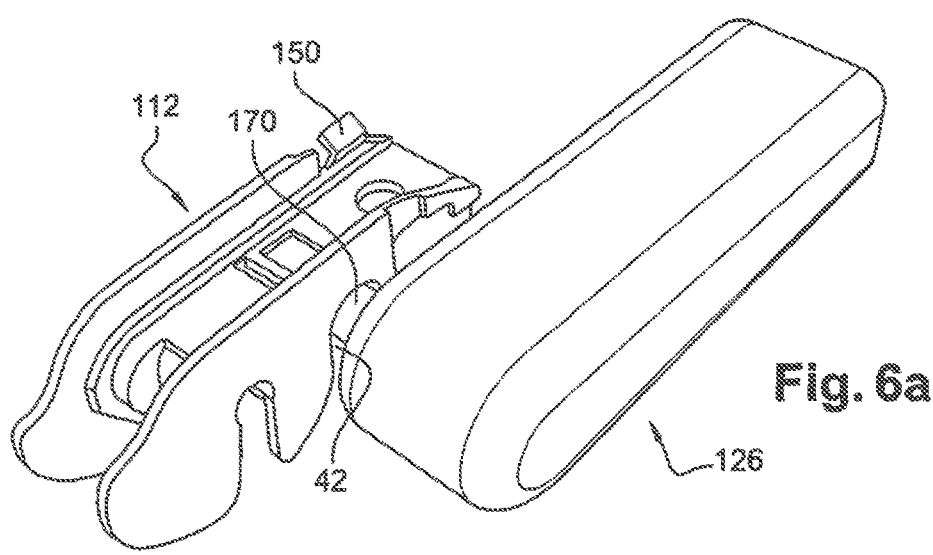
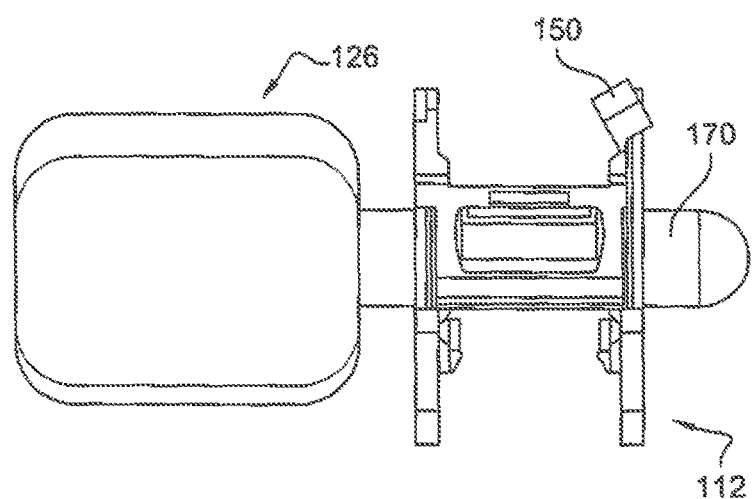
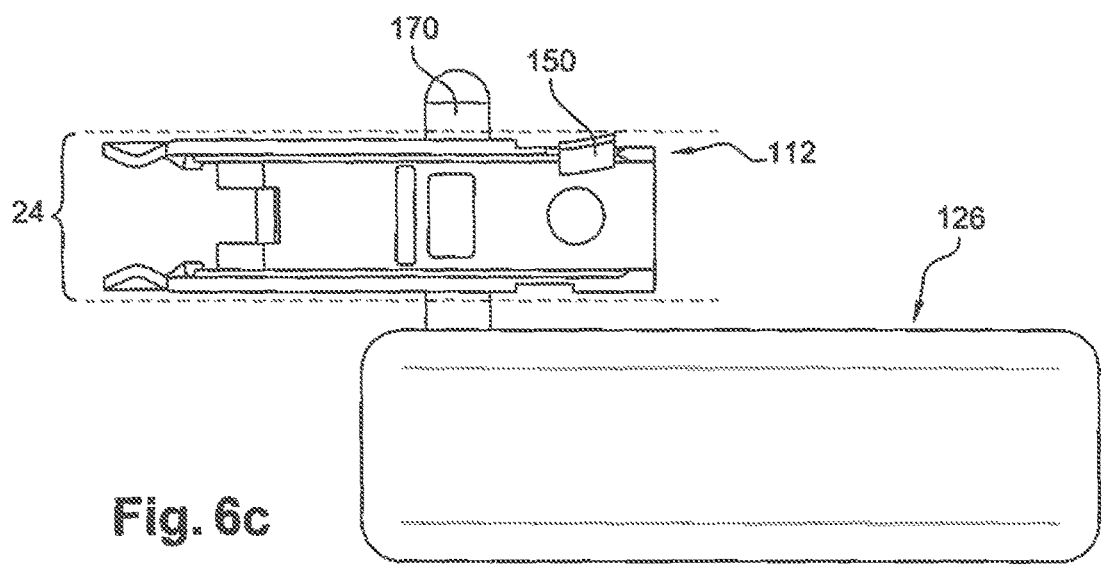

ADAPTOR FOR CONNECTING A WINDSCREEN WIPER UNIT TO A DRIVING ARM

The present invention concerns in particular an adaptor for connecting a windscreen wiper unit to a driving arm, in particular of a motor vehicle.

A motor vehicle is conventionally equipped with windscreen wipers for ensuring cleaning of the windscreen and preventing the driver's vision of the surrounding area from being disturbed. These windscreen wipers generally comprise a driving arm, performing an angular to-and-fro movement, and elongated wiper units which themselves carry wiper blades made of an elastic material. These blades wipe the windscreen and remove the water conveying it outside of the driver's field of vision. The wiper units are made either—in a conventional version—in the form of hinged clamps which hold the wiper blade in several separate locations, providing it with a flexing action which allow it to match any curvature of the windscreen, or—in a more recent version called "flat blade"—in the form of a semi-rigid assembly which holds the wiper blade over its entire length owing to one or more flexing backing elements allowing the wiper unit to be applied onto the windscreen without having to use clamps.

In the two solutions, the wiper unit is attached to the driving arm by a connection system comprising an adaptor and a connector. The connector is a part which is secured to the wiper unit and which may be incorporated in the wiper unit. The connector is directly fixed on the wiper blade or on the flat blade, while the adaptor is joined together with the arm. The adaptor is an intermediate piece which allows the connector to be connected and fixed on the driving arm. It is configured to cooperate with a head or end piece of the driving arm.

The connector and the adaptor each comprise hinging means configured to cooperate with complementary means of the other member, so as to define at least one transverse axis for pivoting of the connector relative to the adaptor, which is an axis for pivoting of the wiper unit relative to the arm. According to the present art, one of the members, such as the connector, generally comprises a substantially cylindrical physical axis which defines the hinging axis and which is received inside a seat having a form complementing the other member.

In certain cases, the adaptor is mounted inside a seat of the connector or of the wiper unit and comprises two walls which are substantially parallel and spaced from each other and connected together by means of at least one connecting element. The walls of the adaptor have inner side faces between which this connecting element extends and outer side faces which are intended to be situated opposite inner side faces of the seat of the connector or the arm and to cooperate by means of sliding with these faces during pivoting of the adaptor relative to the connector or the wiper unit.

The adaptor may also comprise a stop element which is mounted on one of its side walls and which at least partly projects from the outer side face of this wall. The patent EP-B12 027 000 illustrates such a stop element. When the adaptor is mounted inside the seat of the connector, it is designed to rotate about the aforementioned hinging axis. The stop element of the adaptor is intended to cooperate with the connector in order to limit the travel of the adaptor about this axis to a given angular displacement. This allows the adaptor to retain a position facilitating assembly of the adaptor on the driving arm. The cooperation between the stop element and the connector is therefore only required in order to assist the user during assembly of the adaptor and therefore of the wiper unit in general. It is generally not used during operation of the wiper unit. In particular, it is generally not used to limit the angular displacement of the wiper unit relative to the arm during wiping of a glass surface by the wiper unit.

The invention proposes an improvement to this technology.

The invention proposes for this purpose an adaptor for connecting a windscreen wiper unit to a driving arm, the adaptor comprising two substantially parallel walls connected together by means of at least one connecting element, the said walls having first, inner, side faces between which the said at least one connecting element extends, and outer side faces, the said adaptor further having at least one stop element which is mounted on one of the said walls and which projects at least partially from the said outer side face of this wall, characterized in that the said at least one element is movable between an operational stop position and a non-operational position.

The stop element may be in a non-operational position during operation of the windscreen wiper unit.

The adaptor according to the invention may comprise one or more of the following characteristics considered separately from each other or in combination with each other:
the said at least one element is retractable,
the said at least one element is connected by means of a hinge to the said wall,
the said element is formed as one piece with the said wall, and the hinge is formed by a thin film of material connecting the wall to the said element,
the said film of material is situated at the bottom of a groove with a U, C or V-shaped cross-section,
the said hinge defines a hinging axis of the element, which is substantially parallel to an elongation axis of the adaptor and/or substantially perpendicular to a hinging axis of the adaptor,
the said hinge is configured to allow at least a displacement of the said at least one element towards the inside of the adaptor,
the said element has a generally L-shaped form and comprises a first portion extending substantially in a plane of the wall, and a second portion projecting in the form of a stop from the outer side face of this wall,
the said wall comprises a first upper longitudinal edge having a longitudinal end connected to an upper end of a second edge which is substantially perpendicular to the said first edge and a lower end of which is connected to a longitudinal end of a third upper longitudinal edge, the said at least one element being connected to the said third upper longitudinal edge,
the said at least one element is spaced from the said second edge,
the said at least one element has an upper end aligned substantially with the said first upper edge or extending substantially as a continuation of the said first upper edge, and
the said at least one element has, when it is in its operational stop position, an inner side face substantially aligned with the inner side face of the wall, and an outer side face substantially aligned with the outer side face of the wall.

The present invention also concerns a windscreen wiper unit, characterized in that it comprises or supports an adaptor such as that described above.

The present invention concerns furthermore a windscreen wiper arm, characterized in that it comprises or supports an adaptor such as that described above.

The arm may be a hook arm which is mounted between the side walls of the adaptor and is designed to prevent the displacement of the said at least one element from its operational stop position into its non-operational position.

The arm may have a substantially cylindrical stem which is engaged inside a seat of the adaptor, this arm being adapted to allow the displacement of the said at least one element from its operational stop position into its non-operational position.

Figure 4E:
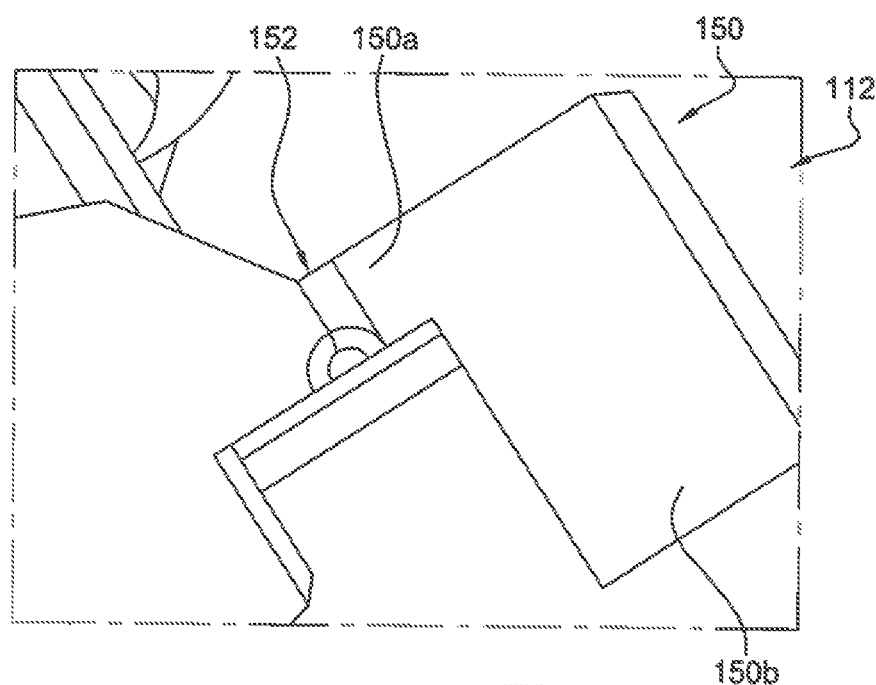
Figure 5A:
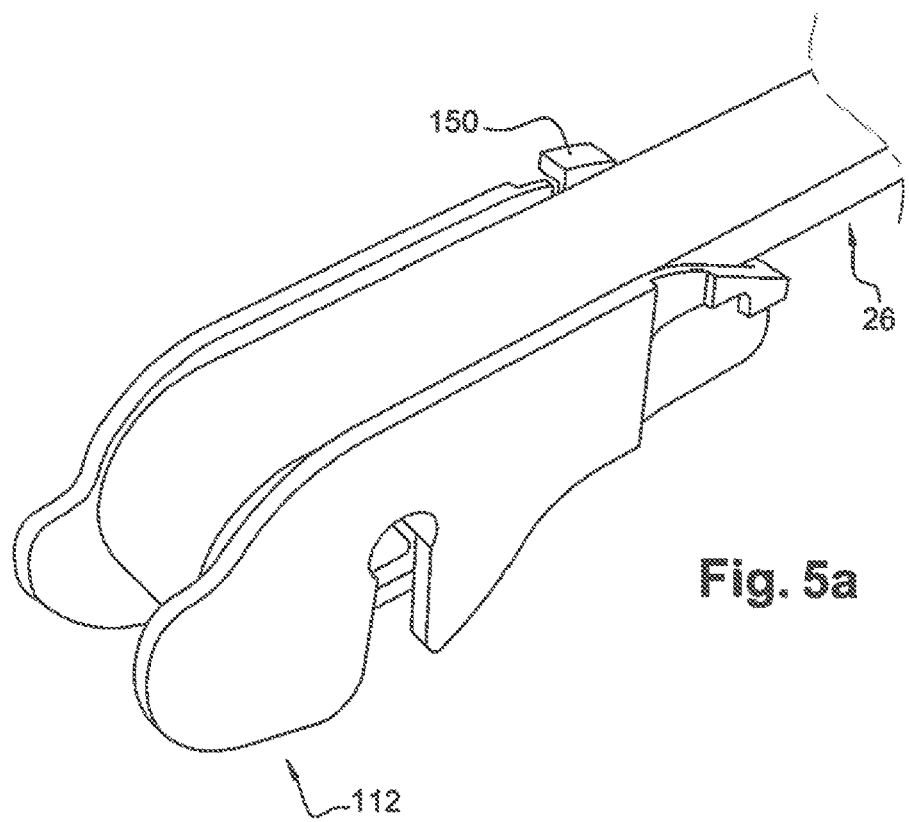
Figure 5B:
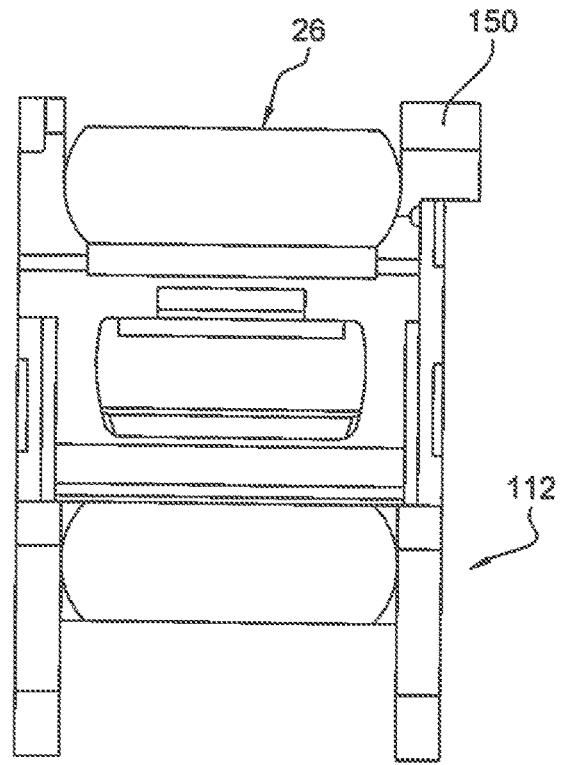

The invention will be better understood and other details, characteristic features and advantages of the invention will emerge from reading of the following description provided by way of a non-limiting example with reference to the attached drawings in which:

FIG. 1 is a schematic, exploded, perspective view of a windscreen wiper unit, this windscreen wiper being equipped with an adaptor for connecting the wiper unit to a driving arm, FIG. 2 is a schematic perspective view of an adaptor, a connector and one end of a driving arm, FIG. 3 is another schematic perspective view of the adaptor shown in FIG. 2, FIGS. 4a to 4e are schematic perspective views of an adaptor according to the invention, FIGS. 5a and 5b are schematic perspective views of the adaptor according to FIGS. 4a-4e associated with a first hook arm of a windscreen wiper, and FIGS. 6a, 6b and 6c are schematic perspective views of the adaptor according to FIGS. 4a-4e associated with a second hook arm of a windscreen wiper.

It should be noted that the figures illustrate the invention in a detailed manner for the purposes of implementation of the invention, whereby the said figures may of course help better define the invention if necessary.

In the description which follows, the terms "longitudinal" or "lateral or side" refer to the orientation of the windscreen wiper unit or the driving arm. The longitudinal direction corresponds to the main axis of the wiper unit or the arm along which it extends, while the lateral orientations correspond to concurrent straight lines, i.e. lines which intersect the longitudinal direction, in particular perpendicular to the longitudinal axis of the wiper unit or the arm in its plane of rotation. As regards the longitudinal directions, the terms "outer" (or "rear") or inner (or "front") are to be understood in relation to the point where the wiper unit is fixed on the arm, the term "inner" corresponding to the part where the arm or a half-arm extend or in relation to the point where the arm is fixed to the vehicle. Finally, the directions indicated as "upper" or "lower" correspond to orientations perpendicular to the plane of rotation of the windscreen wiper unit, the term "lower" containing the plane of the windscreen.

FIG. 1 shows a windscreen wiper unit 10 equipped with an adaptor 12.

The wiper unit 10 is of the flat blade type in the example shown and comprises a longitudinal body 14, a wiping blade 16, generally made of rubber, and at least one backing element 18 which stiffens the blade and favours its application against a glass surface such as a vehicle windscreen.

The body 14 of the wiper unit 10 may have an upper aerodynamic deflector 20 intended to improve the operation of the wiping system, the purpose of this deflector being to improve pressing of the wiper unit against the windscreen and therefore the aerodynamic performance of the windscreen wiper.

The wiper unit 10 may also comprise end pieces 22 or clips for fastening the blade 16 and the backing element 18 on the body 14, these end pieces 22 being situated at each of the longitudinal ends of the body 14.

The wiper unit 10 also comprises an element 23 for fixing the blade 16, which is seated inside the body 14.

The wiper unit 10 comprises substantially in the middle thereof a connector 24 which is intended to receive the adaptor 12, the connector/adaptor assembly forming a system for connecting the wiper unit 10 to a driving arm (not shown in FIG. 1).

The adaptor 12 is mounted on the connector 24 so as to retain a degree of freedom during pivoting about a hinging axis Y which is a transverse axis substantially perpendicular to the longitudinal axis of the wiper unit 10. This degree of freedom allows pivoting of the wiper unit 10 relative to the arm and thus allows the wiper unit to follow the curvature of the windscreen during its movements.

The arm 26, which can be seen in FIG. 2, is intended to be driven by a motor so as to perform an angular reciprocating movement allowing the water and any other undesirable elements covering the windscreen to be removed. Its free end for connection to the adaptor 12 forms a U-shaped hook inside the opening of which the adaptor 12 is intended to be mounted.

The adaptor 12 comprises two parallel side walls 28 which are arranged at a distance from each other and connected together by at least one transverse wall 30 (FIG. 3). The walls 28 have inner side faces 28a between which the transverse wall 30 extends and outer side faces 28b which have profiled projections 32.

The connector 24, which is more clearly visible in FIG. 2, comprises a base 34 with a substantially parallelepiped form having, arranged above it, two side walls 36 which extend as an upper continuation of the side faces of the base and which have the function of gripping the side walls 28 of the adaptor once the latter has been engaged in the connector 24.

The spacing between the walls 36 of the connector 24 is consequently slightly bigger than that existing between the outer side faces 28b of the adaptor. A transverse axis 39 which defines the axis Y and about which the adaptor 12 is designed to rotate within predefined angular limits extends between the two walls 36. Finally, the bottom part of the base 34 has, cut therein, a groove 40 for assembly of the rest of the wiper unit 10 and in particular the fixing element 23.

FIG. 3 shows other details of the adaptor 12 and in particular its transverse wall 30. At its outer end, the wall 30 is extended longitudinally by a semi-cylindrical groove 42 of revolution which is intended to receive the transverse pin 38 of the connector during engagement of the latter onto the adaptor. In order to ensure this engagement, the opening of the groove 42 is slightly smaller than 180° so that it is necessary to exert a force in order to cause the pin 38 to enter into the groove 42.

FIG. 3 also shows a lug 44 which is positioned on the transverse wall 30, this allowing, by cooperating with an orifice (not shown) formed in the U-shaped end part of the arm 26, to secure the latter together with the adaptor 12.

Assembly of the adaptor 12 may be performed in the manner described below. It is inserted between the walls 36 of the connector 24 until the pin 36 engages inside the groove 42 of the adaptor, then the arm 26 is engaged onto the adaptor so that its end part closes off the opening of the groove 42 (FIG. 2) and prevents the adaptor from being detached from the connector.

The profiled projections 32 of the outer faces 28b of the adaptor 12 have the function of cooperating by means of sliding with the opposite inner faces of the walls 36 of the connector, so as to guide in particular pivoting, about the axis Y, of the wiper unit 10 relative to the arm 26 during operation.

The adaptor 12 further comprises a stop element 50 which is visible in FIGS. 2 and 3. This stop element 50 is situated on one of the side walls 28 of the adaptor and projects on the outer face 28b of this wall. It has a general parallelepiped form, the thickness or transverse dimension of which, measured in a direction parallel to the axis Y, is greater than that of the profiles 32.

In the position where the adaptor 12 is assembled and engaged in the connector 24, the stop element 50 is designed to cooperate by means of contact with the upper longitudinal edge of one of the side walls 36 of the connector 24 in order to limit the angular displacement of the adaptor about the axis Y relative to the connector, in at least one (for example clockwise) direction.

According to the present technology such as that shown in FIGS. 2 and 3, this projecting element 50 is fixed in position.

The invention proposes an improvement to this technology and shows an embodiment of the adaptor according to the invention in FIGS. 4a to 4e.

The adaptor 112 according to FIGS. 4a to 4e may comprise all the characteristic features of the adaptor 12, as described above, and differs from this adaptor in terms of the projecting element 150 which is configured here to be displaceable between an operational stop position and a non-operational position.

In the example shown, the element 150 is retractable. In its operational position visible in FIGS. 4a to 4e, as well as in FIGS. 5a and 5b, it is at least partially projecting from the outer face 28b of the corresponding side wall 28 of the adaptor. In its non-operational position visible in FIGS. 6a and 6b, it has been displaced in a transverse direction towards the inside of the adaptor.

The element 150 is here formed as one piece with the wall 28. It is connected to the wall by means of a hinge 152. This hinge 152 has an elongated form and defines an axis 154 for hinging or for rotational displacement of the element, which is substantially parallel to an elongation axis of the adaptor substantially perpendicular to the hinging axis Y of the adaptor.

The hinge 152 is formed as a thin film of material connecting the wall 28 to the element 150. As can be seen in FIGS. 4c and 4e, the hinge and the thin film are defined by a substantially rectilinear groove which has a substantially C, U or V-shaped cross-sectional form. This groove opens out towards the outside of the adaptor. By way of variant, it could open out inside the adaptor.

The hinge 152 is configured to allow displacement of the element 150 in a substantially transverse direction, towards the inside of the adaptor, i.e. towards the side wall 28 opposite to that with the element 150.

In the example shown, the element 150 has a general L-shape and comprises a first portion 150a extending substantially in a plane of the wall 28, and second portion 150b which is substantially perpendicular. This second portion 150b projects from the outer side face 28b of this wall 28 and is designed to make contact against a connector as in the prior art.

When the element 150 is in its operational position, the first portion 150a comprises an outer side face which is substantially parallel to the outer face 28b of the wall, and an inner side face which is substantially parallel to the inner face 28a of the wall. The side faces of the element 150 may be aligned with the side faces 28a, 28b of the wall, respectively.

The second portion 150b may have an inwardly curved general form and comprises two cylindrical surfaces directed respectively downwards 150ba and upwards 150bb. The surface 150ba is a stop surface intended to cooperate with the upper longitudinal edge of the wall 36 of the connector 24, as explained above.

The wall 28 of the adaptor which is connected to the element 150 comprises a first upper longitudinal edge 160a connected at a longitudinal end to an upper end of a second edge 160b which is substantially perpendicular to the said first edge and the lower end of which is connected to a longitudinal end of a third upper longitudinal edge 160c.

The element 150 is connected to the third edge 160c. It is spaced from the second edge 160b. The surface 150bb of the element 150 is substantially aligned with the first edge 160a or extends substantially as a continuation of this first edge 160a.

FIGS. 5a and 5b show the adaptor 112 mounted on a driving arm 26 of a windscreen wiper unit, this arm being a hook arm. This arm comprises a bar, which is generally metallic and the free end of which is bent and curved so as to form a U. This free end of the arm is intended to be mounted on the adaptor, extending between the walls 28 and about their aforementioned connecting element, as shown in the drawings.

In the assembled position, the arm 26 rests on or may rest in the transverse direction on the inner side face of the element 150, which is thus prevented from moving towards the inside of the adaptor. A user attempting to move the element 150 would be unable to do so.

FIGS. 6a and 6b show the adaptor 112 mounted on another driving arm 126 of a windscreen wiper unit. This arm comprises a substantially cylindrical stem 170 which extends in the transverse direction from one side of the arm and is engaged inside the groove 42 of the adaptor.

In this case shown in the figure, neither the arm 126, nor the connector 24 inside which the adaptor is mounted, hinder the displacement of the element 150 which may therefore be displaced into its non-operational position inside the adaptor.

The invention claimed is:

1. An adaptor for connecting a windscreen wiper unit to a driving arm, the adaptor comprising:
    two substantially parallel walls connected together by at least one connecting element, the walls having inner side faces between which the at least one connecting element extends, and outer side faces; and
    at least one stop element which is mounted on one of the walls and which projects at least partially from the outer side face of the one of the walls,
    wherein the at least one element is movable between an operational stop position and a non-operational position,
    wherein the at least one element is connected by a hinge to the one of the walls,
    wherein the hinge defines a hinging axis of the element, which is substantially parallel to an elongation axis of the adaptor, and
    wherein the element is formed as one piece with the one of the walls, and the hinge is formed by a thin film of material connecting the one of the walls to the element.

2. The adaptor according to claim 1, wherein the at least one element is retractable.

3. The adaptor according to claim 1, wherein the said film of material is situated at the bottom of a groove with a U, C or V-shaped cross-section.

4. The adaptor according to claim 1, wherein the hinge defines a hinging axis of the element, which is substantially perpendicular to a hinging axis of the adaptor.

5. The adaptor according to claim 1, wherein the hinge is configured to allow at least a displacement of the at least one element towards the inside of the adaptor.

6. The adaptor according to claim 1, wherein the element has a general L-shaped form and comprises a first portion extending substantially in a plane of the one of the walls, and a second portion projecting in the form of a stop from the outer side face of the one of the walls.

7. The adaptor according to claim 1, wherein the one of the walls comprises a first upper longitudinal edge having a longitudinal end connected to an upper end of a second edge which is substantially perpendicular to the first edge and a lower end of which is connected to a longitudinal end of a third upper longitudinal edge, the at least one element being connected to the third upper longitudinal edge.

8. The adaptor according to claim 7, wherein the said at least one element is spaced from the said second edge.

9. The adaptor according to claim 7, wherein the said at least one element has an upper end aligned substantially with the said first upper edge or extending substantially as a continuation of the said first upper edge.

10. The adaptor according to claim 1, wherein the at least one element has, when in the operational stop position, an inner side face substantially aligned with the inner side face of the one of the walls, and an outer side face substantially aligned with the outer side face of the one of the walls.

11. A windscreen wiper unit comprising or supporting an adaptor according to claim 1.

12. A windscreen wiper arm, comprising or supporting an adaptor according to claim 1.

13. The arm according to claim 12, the arm being a hook arm which is mounted between the side walls of the adaptor and prevents the displacement of the at least one element from the operational stop position into the non-operational position.

14. The arm according to claim 12, comprising a substantially cylindrical stem which is engaged inside a seat of the adaptor, wherein the arm is configured to allow the displacement of the said at least one element from the operational stop position into the non-operational position.

15. An adaptor for connecting a windscreen wiper unit to a driving arm, the adaptor comprising:
two substantially parallel walls connected together by at least one connecting element, the walls having inner side faces between which the at least one connecting element extends, and outer side faces,
wherein one of the walls comprises a first upper longitudinal edge having a longitudinal end connected to an upper end of a second edge which is substantially perpendicular to the first edge, and a lower end of which is connected to a longitudinal end of a third upper longitudinal edge, the at least one connecting element being connected to the third upper longitudinal edge; and
at least one stop element which is mounted on the one of the walls and which projects at least partially from the outer side face of the one of the walls,
wherein the at least one element is movable between an operational stop position and a non-operational position,
wherein the at least one element is connected by a hinge to the one of the walls, and
wherein the hinge defines a hinging axis of the element, which is substantially parallel to an elongation axis of the adaptor.

* * * * *